United States Patent
Shani

[19]

[11] Patent Number: 6,023,563

[45] Date of Patent: Feb. 8, 2000

[54] NETWORKING SWITCH HAVING THE NETWORK PRESENCE OF A BRIDGE

[76] Inventor: Ron Shani, Mitzpe Aviv D.N., Misgav 20187, Israel

[21] Appl. No.: 08/700,017

[22] Filed: Aug. 20, 1996

[51] Int. Cl.[7] .................................................... G06F 13/14
[52] U.S. Cl. .................... 395/200.79; 370/401; 370/402; 395/200.6
[58] Field of Search ......................... 395/200.79, 200.16, 395/200.01; 370/85.13, 401, 402

[56] References Cited

U.S. PATENT DOCUMENTS

| | | | |
|---|---|---|---|
| 5,309,437 | 5/1994 | Perlman et al. | 370/85.13 |
| 5,339,313 | 8/1994 | Ben-Michael et al. | 370/85.13 |
| 5,394,402 | 2/1995 | Ross | 370/402 |
| 5,490,252 | 2/1996 | Macera et al. | 395/200.01 |
| 5,544,162 | 8/1996 | Mraz et al. | 370/60 |
| 5,598,536 | 1/1997 | Slaughter, III et al. | 395/200.16 |
| 5,740,171 | 4/1998 | Mazzola et al. | 370/392 |

*Primary Examiner*—Frank J. Asta
*Assistant Examiner*—Ivan C. Pierce, III
*Attorney, Agent, or Firm*—Mark M. Friedman

[57] ABSTRACT

A Network Switch and related method are disclosed for handling large amounts of internetwork message traffic employing internetwork protocols in a way substantially as efficient as a bridge handles network traffic within a network without the complexity and expense related to employing a full router. The Network Switch features database means for correlating MAC addresses, network addresses, network switch port addresses and VLAN configuration. The Network Switch maintains the network presence of a bridge (i.e., it does not have its own MAC or network address) and operates promiscuously by having internetwork traffic travel through the Network Switch and entering address data of the data packets. The Network Switch thus learns the network topology and subsequently redirects and re-addresses packets addressed to a router and transmits them to their destination MAC address. In this way, the workload on the router is greatly reduced. Any packet having an unknown address is forwarded to the router as originally sent. The related method discloses an internetwork configuration featuring a plurality of networks connected with at least one Network Switch device and at least one router, and serves to alleviate the workload which had been placed entirely on the router according to prior art configurations. The Network Switch also features various modes of operation for handling address resolution requests.

26 Claims, 6 Drawing Sheets

| MAC layer header | | | | | Network layer header | | | | MAC trailer | |
|---|---|---|---|---|---|---|---|---|---|---|
| Header | MDA | MSA | Control | LLC | NDA | NSA | Control | Layers 4 - 7 and Application data | CRC | Trailer |

Fig. 1

| MAC layer header | | | | | Network layer header | | | | MAC trailer | |
|---|---|---|---|---|---|---|---|---|---|---|
| Header | MDA (B) | MSA (A) | Control | LLC | NDA (B) | NSA (A) | Control | Layers 4 - 7 and Application data | CRC | Trailer |

Fig. 2

| MAC address | Port number | age counter | VLAN number | Protocol type | Network address |
|---|---|---|---|---|---|
|  |  |  |  |  |  |
|  |  |  |  |  |  |

Table 1

| Port number | VLAN numbers | Network/ subnet numbers |
|---|---|---|
|  |  |  |
|  |  |  |

Table 2a

| VLAN number | Port numbers |
|---|---|
|  |  |
|  |  |

Table 2b

| Network/ sunbet number | Port numbers |
|---|---|
|  |  |
|  |  |

Table 2c

| Network /subnet number | Subnet mask |
|---|---|
|  |  |
|  |  |

Table 3

| MAC address | Router network address | Protocol type | Port number | age couter |
|---|---|---|---|---|
| | | | | |
| | | | | |

Table 4

NETWORKING SWITCH HAVING THE NETWORK PRESENCE OF A BRIDGE

FIELD AND BACKGROUND OF THE INVENTION

The present invention relates to computer networks, and more particularly, to a method and apparatus for connecting a computer station located on one network, to another station (or stations) located on another network.

Computer networks are made up of computer stations such as PCs, network servers and workstations. These stations are connected to each other via network devices such as repeaters, bridges, switches and routers, each of which is described below.

Communication between two stations connected through a computer network is initiated when one station sends out a request to establish a connection between itself and one or more other stations. That initiative may come from a human user requesting information located on another station, or it may be automatically initiated by a computer program when that program needs to exchange information with another program located on a different station.

The International Standard Organization (ISO) has created a reference model of communication between two stations over a network. This model breaks the communication into 7 layers, and is known as the Open Systems Interconnection (OSI) model. The first layer represents the physical medium at each of the stations. The second layer represents the Data Link. This refers to how the information is divided into packets. Each packet includes fields for the destination address and the source address. These addresses are also referred to as MAC addresses. These addresses are maintained, by convention, by the IEEE. The MAC address designates the vendor that manufactured the device and the device's serial number.

The third layer represents the Network layer. The function of the network layer is routing packets from the source station to the destination station. The Network layer includes network-layer addresses in addition to the MAC-Data Link layer addresses described above. Network layer addresses are composed of a network number (also referred to as a zone or domain) indicating the network on which the station resides and a host number indicating the address within the network of the particular station. As will presently be described below, the host number is different than the MAC (or Data Link layer) address because it is determined locally by the network supervisor, not the IEEE.

The administration of network layer addresses is under the responsibility of the organization that owns the network. Usually the network layer addresses designate a functional group with certain common characteristics, such as permission to access a particular server or share particular resources (printer, communications, etc.). When connecting to a global network such as the Internet, the organization that owns the network must receive a block of network layer addresses, universally administered from that global network administrator, so that there will be no duplication of network addresses.

Thus, there is a major difference in the allocation of addresses between MAC addresses and network layer addresses: MAC addresses are allocated by the device vendor and are thus randomly distributed; network addresses are assigned according to the network operator's wishes and therefore usually designate functional groups.

As mentioned above, communication between stations is performed in packets (also called frames). The source station sends frames, one at a time, to the destination station. Each frame is made up of the various addresses of both the source station and the destination station, as well as information to be transmitted between the two stations. Regarding the addresses, each standard defines the field structure differently. For example, at the MAC layer there are various standards, such as the IEEE 802.3, 802.5, and FDDI. At the network layer, there are many standards, such as the IP protocol, and the IPX protocol. A typical frame format is shown in FIG. 1.

As mentioned above, stations are connected through a network via a number of devices, particularly, repeaters, bridges and switches, and routers. Repeaters are devices that operate at the physical layer of the OSI model. They connect several segments to form a large distance to be covered by the network. Repeaters perform functions of signal processing, such as retiming and signal regeneration. The functions of the repeater do not interfere with the content of the data being transmitted.

Bridges are devices that operate at the Data Link layer of the OSI model. Their operation is defined in the IEEE 802.1D standard. Bridges are used to connect several physical domains (such as two segments) together. Bridges thus isolate physical segments and forward messages from one segment to the other based on the destination address of the frame.

Bridges having multiple ports are sometimes referred to as Switches. They operate as follows:

1. Station A sends a frame to station B (the frame format is described in FIG. 2).

2. The bridge receives the frame and looks at its database to find out through which port it connects to the destination station. (It does this by analyzing the MAC destination address (MDA).)

2.1. If the destination connects to the same port (segment) as the source, the bridge discards, or filters, the frame.

2.2. If the destination connects to another port (segment), the bridge forwards the frame to the appropriate port.

2.3. If the bridge cannot identify the destination location, or when the MDA designates a broadcast or multicast frame, the bridge forwards the frame to all its ports except for the port on which it received the frame.

3. The switch now looks at the MAC source address (MSA) and registers the presence of the source station on the port where that frame was received in a database. This is a "Learning Process" in which the switch learns the topology of the network.

In some cases, the network supervisor may allow only particular connections within a Local network (LAN). For example, only stations connected to port X on the switch are allowed to communicate with stations connected to port Y. Yet another example is if station Z is allowed to communicate with station W. Such a configuration is called a Virtual LAN (VLAN). The allowed connections are stored in the bridge authorization table. In such a case, when a station initiates a communication with another station via the bridge, the bridge analyzes, in addition to the above, whether both the sending and receiving stations reside on the same VLAN. The bridge would operate as follows:

1. Station A transmits a frame to station B (the frame format is described in FIG. 2).

2. The bridge receives the frame and searches its database to find out if both the source and destination stations belong to the same VLAN. If they do, the bridge searches its database to find out through which port it connects to the destination station. (It does both searches by analyzing the MAC destination address (MDA).) If however, both stations do not belong to the same VLAN (i.e., they are not authorized to communicate with each other) the bridge discards the frame. Assuming both belong to the same VLAN, the process continues as follows:

2.1. If the destination connects to the same port (segment) as the source, the bridge discards, or filters, the frame.

2.2. If the destination connects to another port (segment), the bridge forwards the frame to the appropriate port.

2.3. If the bridge cannot identify the destination location, or when the MDA designates a broadcast or multicast frame, the bridge forwards the frame to all its ports belonging to the same VLAN, and to all ports to which stations belonging to the same VLAN are connected, except for the port on which it received the frame.

3. The bridge now checks the MAC source address (MSA) and registers the presence of the source station on the port where that frame was received in a database. This is a "Learning Process" in which the bridge learns the topology of the network.

In addition to the filter and forwarding functions just described, bridges also communicate with other bridges in the network to learn the network topology and to detect closed loops. A closed loop is when bridges are connected in parallel creating a redundancy. Once a closed loop is detected, the bridges collectively decide which link will be operational and which will be stand-by. This mechanism is called "Spanning Tree" and is defined in the IEEE 802.1D standard.

Discussion now turns to Routers. Routers are devices that operate at the network layer. They connect two or more networks having different network numbers. Thus, Routers end the Data Link layer, by connecting several Data Link control domains (these domains are known as MAC, or Data Link Control (DLC), domains).

Routers operate in the following manner:

1. A device (A) connected to a network segment needs to send information to device (B) connected to a different network segment. Device (A) checks (B)'s Network address (NDA) for (B)'s network number.

1.1. If network number (A)=network number (B), both (A) and (B) connect to the same DLC domain. Therefore, (A) now searches for (B)'s MAC address, and sends the message directly to (B). In this case the router is not involved in the communication between (A) and (B). If (A) does not know (B)'s MAC address, it broadcasts a query to all stations in its DLC domain asking (B) to respond with its MAC address. After (B) responds, (A) will send its frames directly. Device (A) will send the message frame to (B) with the following parameters:

| MDA = MAC address (B) | NDA = network address (B) |
| MSA = MAC address (A) | NSA = network address (A) |

1.2. If network number (A)≠network number (B), then (A) and (B) belong to two different DLC domains. In such a case, (A) will communicate with (B) using the router. (A) sends the message frame to the nearest router ($R_1$) with the following parameters:

| MDA = MAC address ($R_1$) | NDA = network address (B) |
| MSA = MAC address (A) | NSA = network address (A) |

1.2.1. If the nearest router ($R_1$) recognizes (B)'s network number and it knows (B)'s MAC address, it will transmit the frame to network number (B) with the following parameters:

| MDA = MAC address (B) | NDA = network address (B) |
| MSA = MAC address ($R_1$) | NSA = network address (A) |

If the router does not know (B)'s MAC address, it uses the process described in 1.1 to ask (B) to respond with its MAC address. The different terms 'forward' and 'transmit,' are used to indicate the different operations of bridges and routers. Bridges forward frames, or packets, of data, meaning that they send an unmodified frame to its destination. By contrast, routers transmit frames, meaning that in addition to forwarding the packet, the packet is processed and is modified to reflect the processing results for the new route.

1.2.2. If the router ($R_1$) does not recognize (B)'s network number, it communicates with the other routers in the global network, asking them for the way to communicate with network number (B). In some network standards, such as IP, if ($R_1$) does not know where the destination resides, it sends the frame to a default address. When ($R_1$) receives the information that (B) resides after Router ($R_i$), it sends (A)'s frames to ($R_i$) with the following parameters:

| MDA = MAC address ($R_i$) | NDA = network address (B) |
| MSA = MAC address ($R_1$) | NSA = network address (A) |

If $R_i$ physically connects to (B)'s network number, it now follows the procedure described in paragraph 1.2.1. above to transmit the frames to (B). If $R_i$ is not physically connected to network number (B) it follows the procedure outlined in paragraph 1.2.2., until the frames reach Router ($R_x$) that physically connects to network number (B).

According to the present technology, communication between stations having different network addresses can only be performed via a router, in the method described above. This is true even in a case in which two stations are physically connected by a bridge, because bridges do not process addresses from different networks. This is an undesirable limitation of the current system, because routers are more expensive than bridges. In addition, their transmission rate is low. Also, routers do not forward broadcast messages. Routers do have a much larger capacity for data and can learn complex network topologies spanning thousands of stations, because they maintain a database of networks, not a database of individual stations. There is therefore a widely recognized need for, and it would be highly advantageous to have, a device featuring the simplicity of a bridge and the potential to connect between networks like a router. It would be further advantageous to have such a device compatible with current network devices and structures.

One attempt at such a device is described in U.S. Pat. No. 5,309,437. Here a Bridge-Like Internet Protocol (BLIP) router is disclosed. This device operates like a bridge for non-TCP/IP traffic, and in a bridge-like manner for TCP/IP traffic. The objectives of the BLIP are two:

(1) Reduce the amount of inter-network broadcast frames that may lead to broadcast storms. The BLIP limits ARP broadcast requests to the local segment by responding to ARP requests, eliminating the need to forward such requests to the entire network; and (2) Transmit even those IP packets too large to be transmitted by a bridge and would therefore have been discarded by a conventional bridge.

That patent indicates that the above objectives are solved using routers, yet routers are complex and expensive devices. Therefore it offers a new device—the BLIP, to achieve these objectives. The BLIP, however, operates as a router in route calculations, thus maintaining the router's adverse limitation of long processing and calculation time. It would be highly advantageous to have a device that reduces the router's long processing and route calculation times, thereby increasing the overall network throughput.

BLIPs operate under several assumptions:

(1) An IP "extended network" is sub-segmented into subnets, where each port of the BLIP corresponds with a different subnet.

(2) All hosts and routers are unaware of the subnet level of addressing, and all of the subnets in the extended network are perceived to be in the same network.

(3) The source host issues an ARP request to determine the MAC address of its intended destination.

Yet in real IP networks, where the extended network is sub-segmented into subnets, hosts and routers are aware of the subnet level. Therefore a source host will not issue an ARP request, but will direct any message addressed to a station located on a different subnet to a router. It would be highly advantageous to have a device that overcomes the limitations of prior-art bridges and routers, but does not limit itself to the BLIP operational assumptions.

The BLIP operates as follows:

(1) The BLIP re-directs all inter-subnet traffic to itself by intercepting all ARP requests and generating ARP replies using a special address code: "All Adjacent BLIPs" (AAB), as the requested destination's MAC address.

(2) The BLIP generates periodic ARP requests to update its databases.

(3) If the host station generates a message wherein the destination is located within the extended network on a different subnet, but uses an MDA other than the special AAB address, the BLIP will issue a special "redirect" command to that host station, in order to have the station send further frames directly to the BLIP.

(4) When the BLIP receives an IP frame, it ignores the MAC address, and makes routing decision based only on the IP NDA.

While the BLIP does accomplish the first objective of its design, it has many shortcomings:

(1) Analogous to a router, every BLIP makes route calculations based on the IP NDA. This takes a relatively long time, increases the delay of the network, reduces the network throughput, and increases the response time.

(2) The BLIP actively redirects each frame of inter-subnet traffic to itself, and actively generates periodic ARP requests to update its databases.

(3) The BLIP assumes that hosts and routers are unaware of the network subnets, and therefore the hosts initiate communications using an ARP request.

(4) The BLIP further assumes that every physical port has a different subnet address.

(5) The BLIP also assumes that all stations within its extended network belong to the same network number. Further, it learns only IP subnets that belong to the same extended network.

It would be highly advantageous to overcome the above limitations, and design a device that (1) enables faster routing decisions in order to reduce the network response time and increase the network throughput; (2) is a passive device that does not increase the network load; (3) assumes that all devices are aware of network subnets; and (4) enables the flexibility of connecting every station regardless of its location, and does not pose any limitation on network or subnet location.

There is thus still a widely recognized need for, and it would be highly advantageous to have, a network device for transferring packets maintaining the simplicity of a bridge, and still having the capacity to span networks as a router, particularly if the device would not impose its own limitations or restrictions on any network. The Network Switch addresses all the above issues, and satisfies the need for better LAN performance and connectivity flexibility.

SUMMARY OF THE INVENTION

The present invention is of an apparatus and related method for transferring data between stations located on different networks in order to relieve the workload on the router according to prior art configurations. The apparatus is made up of a bridge-like device featuring a network topology learner, a database, a data packet modifier and a data packet transmitter. The network topology learner is a component for passively learning network topology on both the Data Link layer and on the Network layer of the OSI model. Similar components are currently employed in learning bridges, however the network topology learner gathers information relating not only to Data Link layer addresses as a common bridge, but also gathers information relating to Network layer addresses. Without limiting the present invention in any way, it is pointed out that such means are commonly found in prior art routers. Accordingly, the apparatus receives frames traversing a network, in a manner analogous to a bridge and the network topology learner enters MAC address and network address data of the received frame into the database. This network topology information is stored in a database included in the apparatus. The data packet modifier selectively processes data packets (frames) destined to a router, and modifies them to include the final destination MAC address of the frame, based on the destination network address, when this information is included in the database. Without in any way limiting the scope of the present invention, it is pointed out that components such as these for modifying packets, or frames, of data are commonly employed in routers. Once the apparatus completes that process, it transmits the modified packet to its destination using the final destination MAC address. Again, without limiting the invention in any way, it is pointed out that packet transmitting means such as this are common in routers. If a packet's network destination address is unknown to the apparatus, it forwards the packet to a router.

According to further features in preferred embodiments of the invention described below, the apparatus features a plurality of ports, and the network topology learner correlates a station's MAC address with its network address and the port through which it connects to the device.

According to further features in preferred embodiments of the invention described below, the frame modifier includes means for marking a hop counter included in the packet of data. Without in any way limiting the scope of the present invention, it is pointed out that this is a common feature in prior art routers.

According to still further features in preferred embodiments of the invention described below, the device features a silicon-based (ASIC) design, thereby processing, modifying, transmitting and filtering frames at wire speed.

The related method according to the invention described below is a method of operation of a configuration of interconnected networks handling message traffic in accordance with a set of network protocols entailing the steps of configuring a plurality of networks to be connected by at least one network switch and at least one router. Data packets traverse the Network Switch which processes the packet if possible, or forwards it to the router. If the frame's MAC destination address (MDA) points to a router, and that router connects to the Network Switch at the same port as the source station, the Network Switch discards the packet.

According to further features in preferred embodiments of the invention described below, the processing includes verifying whether the packet is a broadcast, multicast or a unicast message. If it is broadcast or multicast, the Network Switch forwards the packet to all ports configured to the same VLAN, except for the port through which the packet was received.

According to further features in preferred embodiments of the invention described below, the Network Switch analyzes each unicast frame to verify whether its MDA indicates a router. If it does not indicate a router, the Network Switch forwards or discards the frame as a bridge. If it does indicate a router, the Network Switch uses the database means to locate the MAC address which correlates with the NDA. Once the NS recognizes the destination station's MAC address, it processes the frame as described below.

According to still further features in preferred embodiments of the invention described below, the processing modifies the incoming frame as follows: (1) replace the router MDA with the destination station's MAC address as extracted through the database means; (2) replace the source MAC address (MSA) with the router's MAC address; (3) mark the hop count according to the specific network-layer protocol, and discard the frame and issue an error message if the hop count exceeds its limit; and (4) re-calculate the new frame check-sum and/or CRC to include the results of the above frame processing.

According to further features in preferred embodiments of the invention described below, the Network Switch features the capacity to process address resolution requests in various manners. Accordingly, the first step is to analyze how the Network Switch is configured to handle address resolution requests, and subsequently process such a request accordingly.

According to further features in preferred embodiments of the invention, if the packet of data is an address resolution request, the Network Switch has a designated proxy server and forwards the packet to the proxy server.

According to still further features in preferred embodiments of the invention, the Network Switch processes address resolution requests in the following manner: it extracts the network destination address, and searches the Network Switch database for the corresponding MAC destination address. If the relevant MAC destination address is featured in the database, and it connects to a different port, the Network Switch generates a response with the appropriate MAC address. If the relevant MAC address is not included in the database, the address resolution request is forwarded to all ports configured with the same VLAN, except for the port through which the address resolution request was received.

According to further features in preferred embodiments of the invention described below, the Network Switch analyzes source address information and correlates source network addresses, source MAC addresses, source VLAN configuration information and Network Switch port numbers indicating the port through which the station is connected to the Network Switch, and enters this information into the Network Switch database.

According to further features in preferred embodiments of the invention described below, the Network Switch (NS) resets an aging counter included in the database means when a packet is processed by the Network Switch.

According to still further features in preferred embodiments of the invention described below, if a discrepancy is detected between the port number through which a particular router connects to the NS and the port number featured in the NS database means, the NS generates an address resolution request for that router and updates the database means based on the response received.

The device of the present invention successfully achieves the objectives outlined above by providing a passive, or promiscuous, learning device for learning the network topology on both the MAC layer and the network layer, and thereafter using that information to process and transmit frames between networks. This greatly reduces the workload upon router devices present in the network. This results in a net saving of both the high cost of routers and is an improvement over the existing relatively slow processing time.

Significantly, this is achieved without altering the network operation as other attempts have done, particularly the BLIP devices described above. Further, the device of the present invention does not even register as an additional router device, but acts in a silent, unobtrusive manner within the network.

Further benefits of the invention are that the Network Switch is capable of processing internetwork communications wherein the two stations connect to the Network Switch via the same port and use different network or subnet numbers.

BRIEF DESCRIPTION OF THE DRAWINGS

FIG. 1 illustrates a generic frame format used in local network communication;

FIG. 2 illustrates a frame format in which station A is sending a frame to station B;

Table 1 is a table of the main database;

Tables 2a–2c are tables of the Port Assignment (PA) database;

Table 2a is a table in which the port number is the key;

Table 2b is a table in which the VLAN number is the key;

Table 2c is a table in which the network or subnet number is the key;

Table 3 is a table of the Network database;

Table 4 is a table of the Router database.

In the Figures, MDA stands for MAC-layer Destination Address, MSA stands for MAC-layer Source Address, NDA stands for Network-layer Destination Address, NSA stands for Network-layer Source Address, TTL stands for Time To Live, and VLAN stands for Virtual LAN.

DESCRIPTION OF THE PREFERRED EMBODIMENTS

Figure 3:
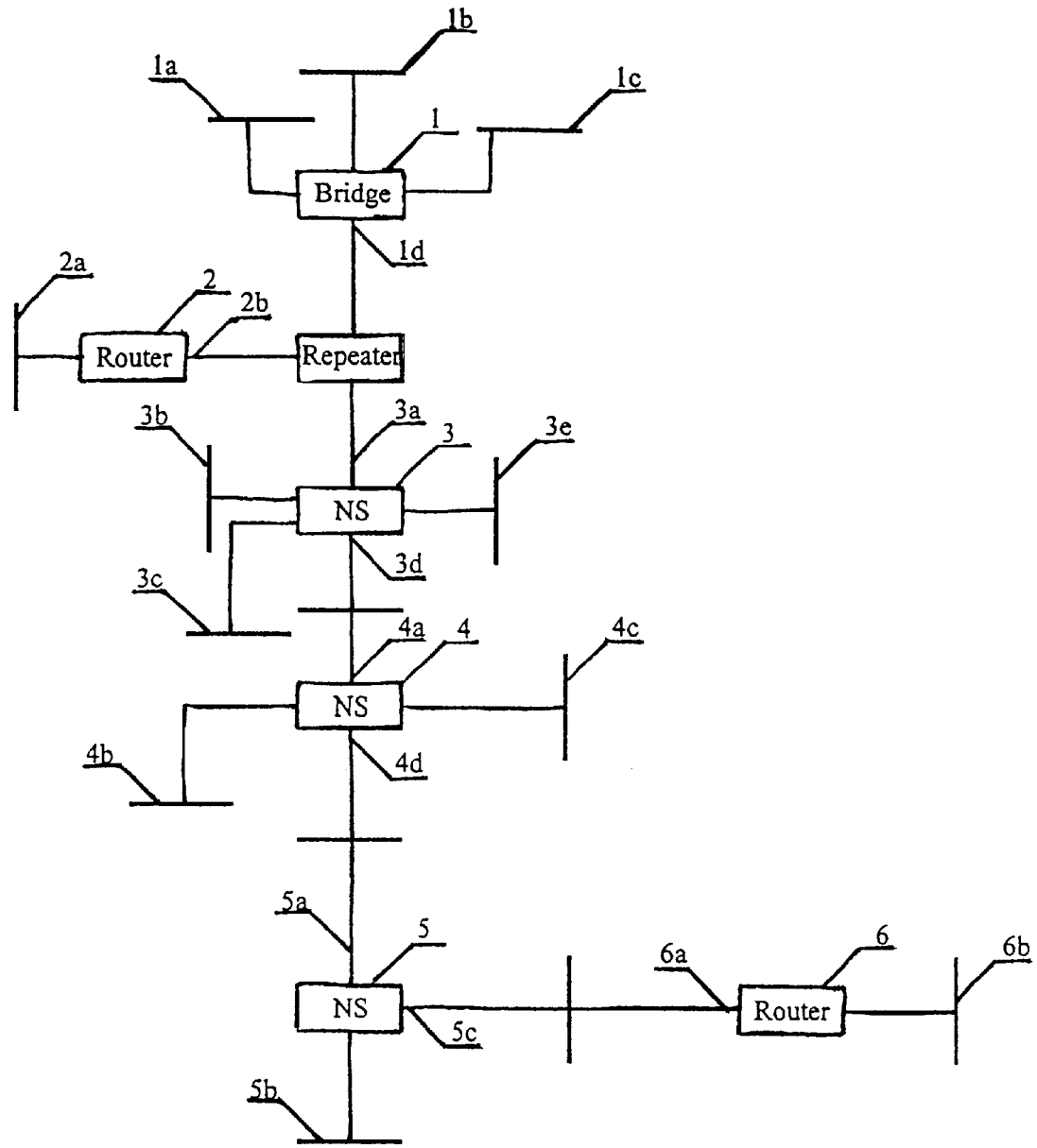
FIG. 3 illustrates a typical network made up of computer stations, repeaters, bridges and routers.

The invention is herein described, by way of example only, with reference to the accompanying figures, wherein FIG. 3 shows a typical network made up of several network elements including Bridge 1, Routers 2 and 6, a Repeater, Network Switches 3, 4 and 5, and segments 1a–1d, 2a–2b, 3a–3e, 4a–4d, 5a–5c and 6a–6b. As can be seen from the Figure, the Network Switches 3, 4 and 5 connect local area network (LAN) segments. According to the prior art, these segments would have to belong to a single LAN and connect to external networks via Routers 2 and 6. Thus, if various stations connecting to segments 1a–1d, 3a–3e, 4a–4c and 5a–5c used different network (or subnet) numbers, Routers 2 and 6 would have to translate the network numbers in any communication between stations, as described in the preceding sections.

Using the Network Switch (NS), there is no restriction regarding assigning different network (or subnet) numbers to any station in the network. Once the network topology is learned by the NS (by listening to the Router and to network activity) the NS functions as the interpreter (or network number translation means) in place of the router. Routers 2 and 6 continue to function as gateways to external networks 2a and 6b, and as topology learning facilitators that enable the NS to learn the various networks.

The NS operates using a mode called Fast Route. In this mode, the NS listens passively to every frame flowing through the network, and also listens to the routers' routing decisions as they respond to network queries. The NS stores this topology information in a database that correlates each known MAC address to the port through which it is connected to the NS (like a bridge), and in addition also correlates every known MAC address to a network address and VLAN number. A secondary function of the NS is to use the Spanning Tree protocol (defined in IEEE 802.1D) to ensure that the network does not contain any closed loops.

The NS database is made up of 4 smaller databases: the Main database, the Port-Assignment database, the Network database and the Router database. Tables 1–4 feature tables illustrating the structure of each database.

The Port-Assignment (PA) database has a many-to-many structure, because a number of VLANs or LAN segments may connect to a single port, or alternately, a single VLAN or LAN segment may span several ports. Without in any way limiting the scope of the present invention, one approach to handle many-to-many mapping is shown in the tables featured in Tables 2a–2c. According to such a configuration, the PA database uses three tables. The first (shown in Table 2a) uses the port number as a unique key entry and correlates multiple VLAN and network/subnet numbers. The second (shown in Table 2b) uses the VLAN number as a unique key and correlates it to multiple port numbers. The third (shown in Table 2c) uses network/subnet numbers as the unique key and correlates each to appropriate port numbers. A background process is used to synchronize all database tables and handle exceptions.

Figure 4:
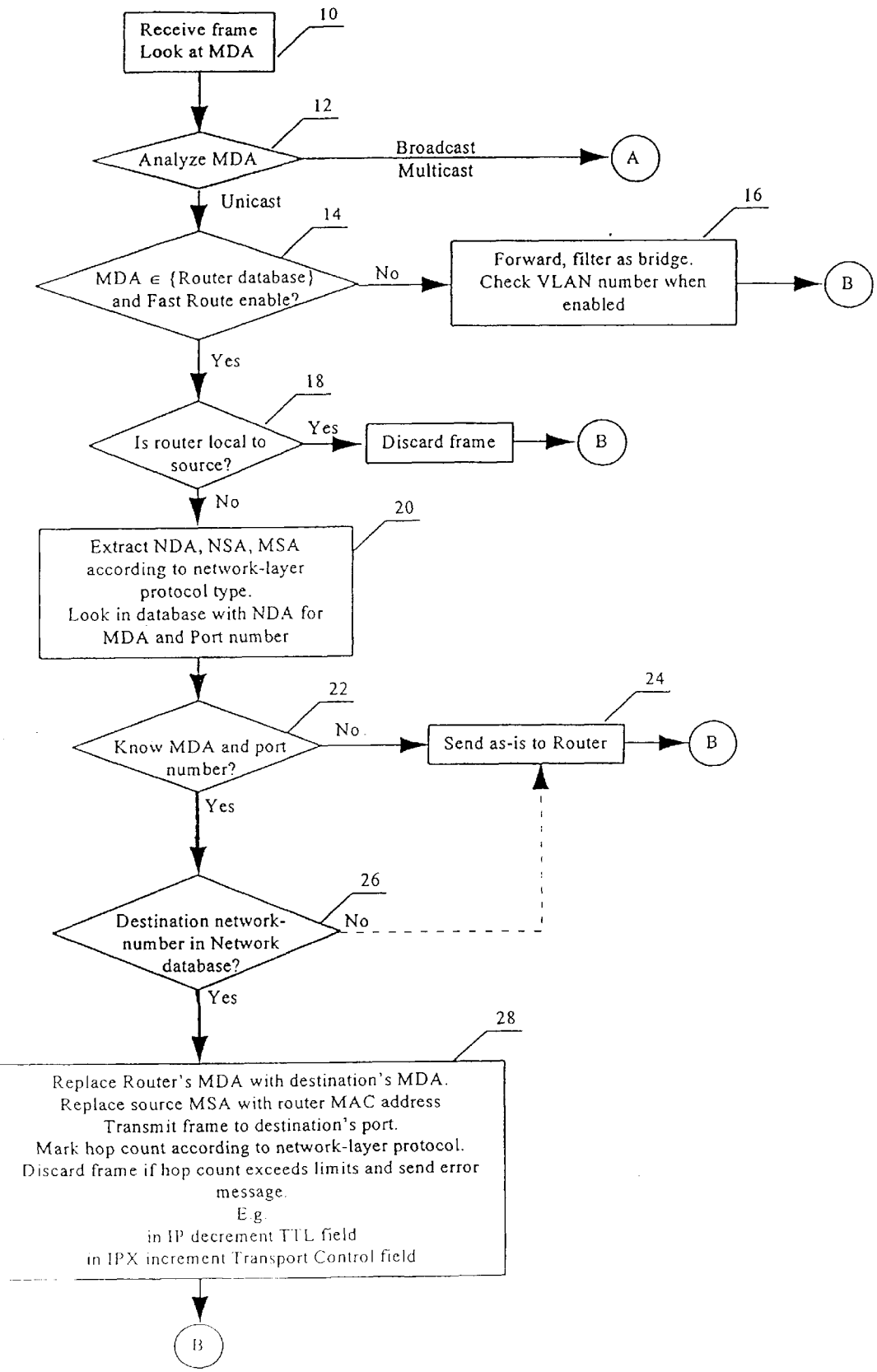
FIG. 4 is a flow chart depicting the Network Switch operation regarding unicast frames.
Figure 5:
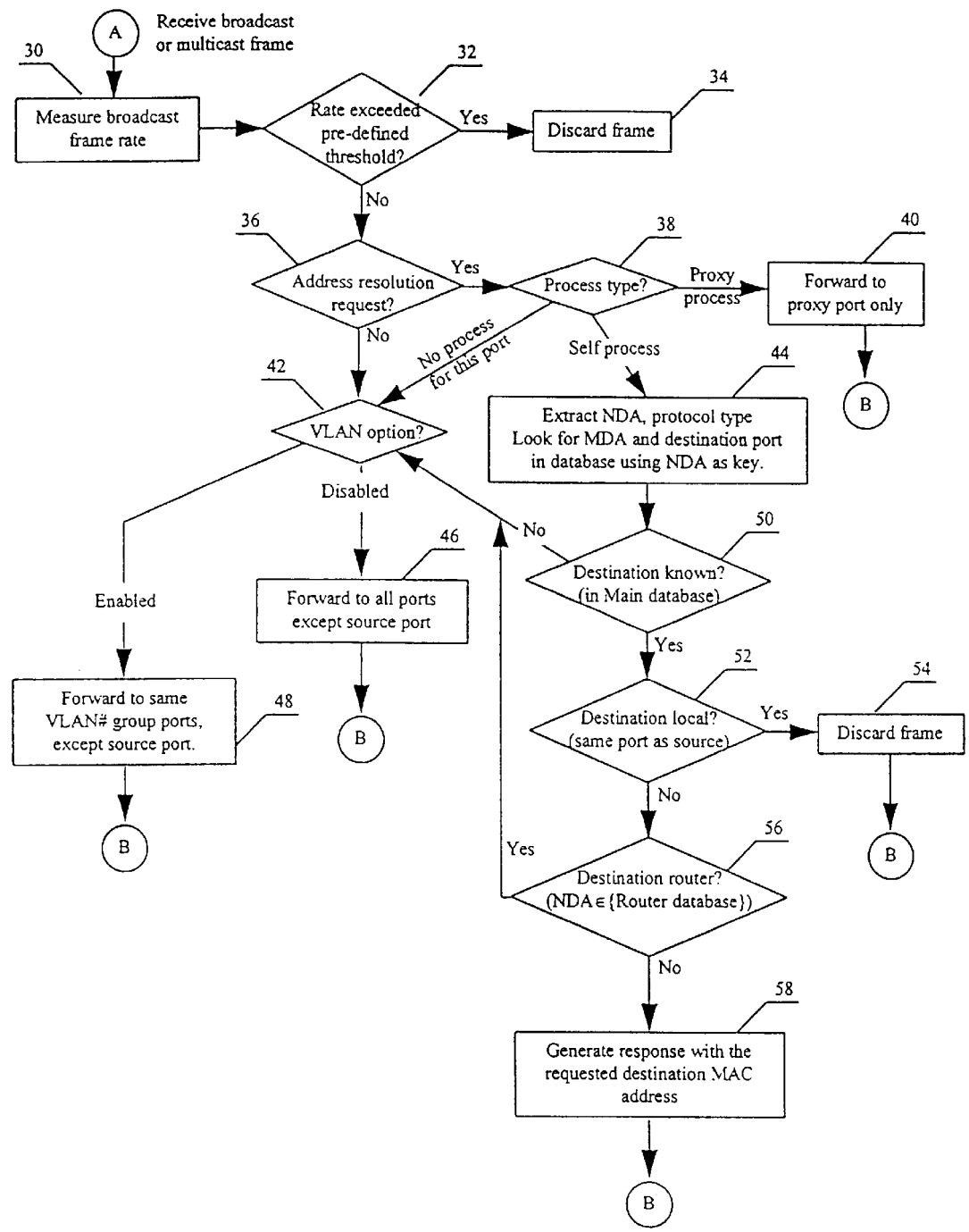
FIG. 5 is a flow chart depicting the Network Switch operation regarding broadcast and multicast frames.
Figure 6:
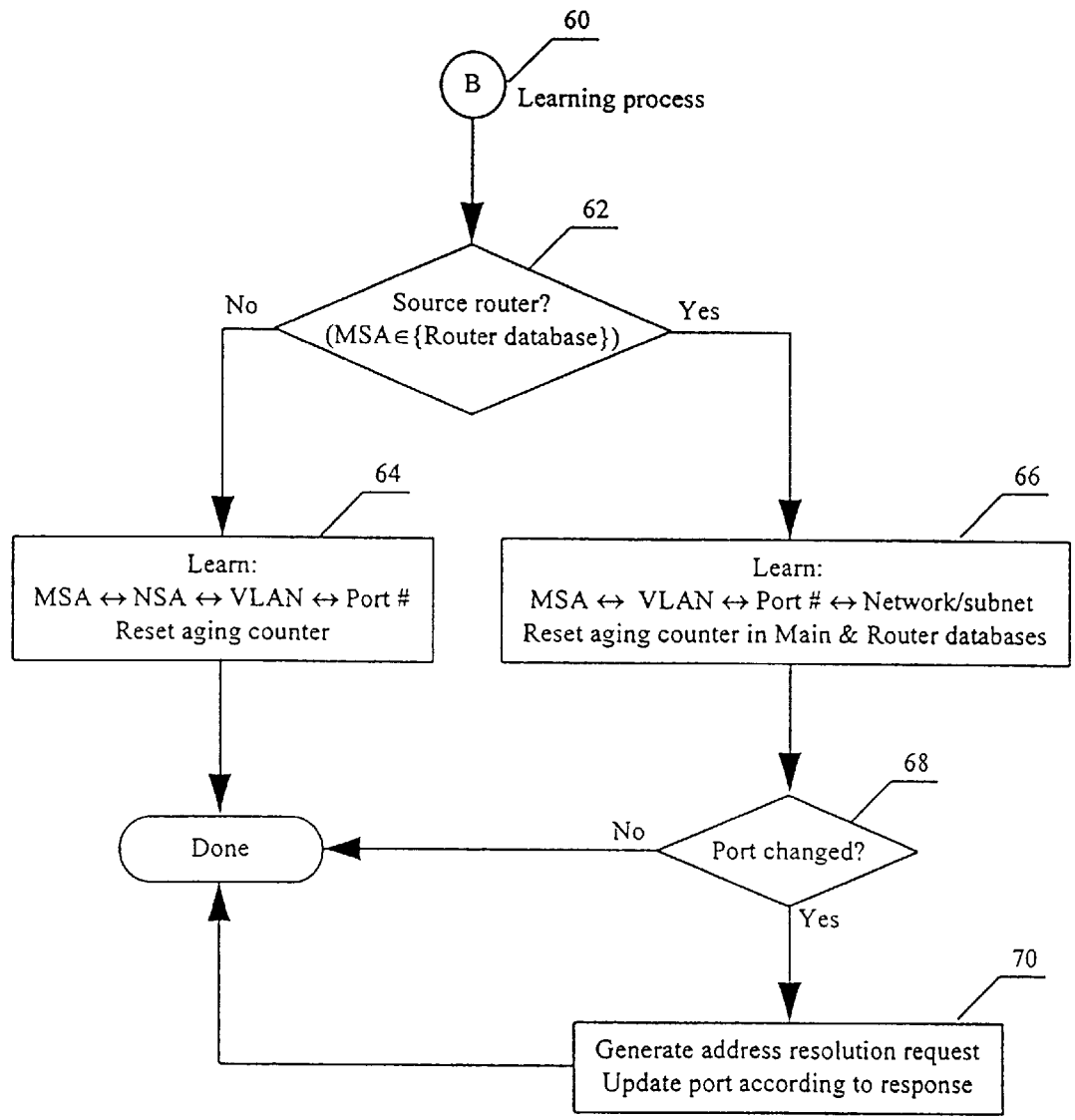
FIG. 6 is a flow chart depicting the Network Switch learning process.

FIGS. 4, 5 and 6 describe the NS operation. The NS starts processing when it receives a frame on one of its ports, as shown in block 10 of FIG. 4. The first step is to check the MDA (12) of the received frame, and deciding if the MDA is a unicast, broadcast or multicast message. FIG. 4 describes the process flow of a unicast message, and FIG. 5 describes the process flow of broadcast and multicast messages.

Once the NS decides that the incoming frame is unicast, it consults its Router database (14) to see if the incoming frame's destination is to a router. If the destination is not to one of the routers in its database, or the Fast Route mode is disabled, the NS continues to process the frame as a standard bridge (16) and following the forward/discard decision it moves to learning mode (60).

The learning mode (60), described in FIG. 6, is the final step in the processing of each frame. In this mode the NS learns about new stations and verifies its databases accuracy for existing stations. The NS updates the Main database with the station's MAC address correlated with its network address, port number, VLAN number (when enabled), and protocol type. The Main database also serves to indicate when a station no longer connects to the network by using an aging count-down counter. See the table shown in Table 1 for the Main database structure. In the learning process the NS further updates its PA database, correlating port number to VLAN number and to network/subnet number as defined in Table 2.

The NS starts the learning process by searching the Router database, to determine whether the frame source is a router (62). If it is not (64), the NS correlates the MAC source address (MSA) with the network source address (NSA), port number, and VLAN number when enabled, and updates its Main and PA databases. The NS further resets the aging counter. If the frame source is a router (66), the NS correlates its MSA with the port number, network or subnet number, and VLAN number when enabled, and resets the aging counter both in the Main and Router databases. When the NS detects that the port number is different (68), it does not update the new port number. Rather, it generates an address resolution request, and updates the router's port number based on the response (70).

The NS can learn and update the Network and Router databases from the network traffic, using the network-layer protocol definitions. Alternately, these databases could be supplied.

Referring to FIG. 4, if in step 14 the NS decides that the incoming frame destination MAC address is to one of the routers in the Router database and the Fast Route mode is enabled, it proceeds to use the Router database to search for the destination router port number (block 18). It compares the router's port number with the incoming frame port, and if they are the same, indicating that the router and the source station are local, it discards the frame and activates the learning process (60 in FIG. 6).

If the source station and the router are not local, the NS looks further into the incoming frame and extracts the DLC and network layers headers according to the specific MAC sub-layer and network-layer protocols types (block 20 in FIG. 4). The NS extracts the frame's MSA, NDA, NSA, protocol type, and VLAN number if this feature is enabled. With that data the NS searches the Main database, using the NDA as a key, for the destination's MAC address and port number. Also if the VLAN option is enabled it searches for the destination's VLAN number.

If the NS finds the NDA in the Main database it continues to process as shown in block 28. Otherwise, the NS does not know how to process this frame, so it forwards the frame to the destination router according to the original MDA for further processing and route decision (24), and moves to the learning process (60 in FIG. 6).

When the NS does know where the destination station is located (22), it proceeds to block (28) where it replaces the router MDA used by the source station with the destination's real MAC address as extracted from the NS Main database, and places the router's MAC address as the MSA instead of the original MSA. The NS also makes the required adjustments to other fields in the frame according to the specific network-layer protocol definitions. For example, in the IP protocol, the NS decrements the field known as Time-to-live (TTL), or in the IPX protocol the NS increments the field known as Transport Control. Both fields designate the number of routers (hops) that the frame passed through on its way to the destination. If the hop count exceeds the protocol-specific requirements, the NS will discard the frame and generate an error message. If the hop count is within the specified limits, the NS transmits the frame to the destination station's port number, and moves to the learning process (60 in FIG. 6).

One possible modification is to add process (26) in which the NS checks the network destination address (NDA) in its Network database. If the network portion of the NDA is not in the Network database, the NS forwards the frame as-is to the designated router. This modification helps to prevent accidental miss-behavior when the NS learns the MAC address of a station which is actually connected beyond a router and therefore does not belong to the NS domain. Normally, the NS would attempt, in vain, to transmit the frame directly to the MAC address. Accordingly, the router would not receive the frame, and the frame would thus be lost.

FIG. 5 describes the NS process when it receives a broadcast or multicast frame. One of the hazards in MAC-layer devices is the multiplication of broadcast messages, yielding to broadcast storms. The NS provides several means to protect the network from such storms. The first means the NS uses is to measure the rate of broadcast frames (30), and discard frames if the rate exceeds a pre-defined threshold (34).

If the broadcast rate does not exceed the pre-defined threshold, the NS attempts to process the broadcast frame itself. First the NS looks at the frame, and analyzes whether or not the frame is an address resolution request (36) as per the specific network-layer protocol type, e.g. ARP in the IP protocol. If the frame is an address resolution request, the NS can act in three modes, two of which aim at reducing the broadcast distribution—self process and proxy process—and third as defined in IEEE 802.1D.

In some networks there may be a station that processes address resolution requests and generates responses. Such a station constantly learns the network topology, and through the address resolution requests updates network stations as to the correct correlation of MAC addresses with network-layer addresses. The operation of such a proxy station depends on the ability of the network to direct the address resolution requests to it, and to avoid flooding the network with such requests. The NS supports this mode (40). When the proxy process is enabled, the NS knows, through manual configuration, the port through which the proxy station connects, and directs every address resolution request, based on protocol type, to the proxy station's port. When in this mode, the NS does not transmit broadcast frames of address resolution request to any other port.

The NS itself can act as the proxy station, generating address resolution responses according to its Main database. This mode is designated "self process" in block 38. The NS looks at the incoming frame and extracts its NDA, MSA, NSA, protocol type and port number, and, using the NDA as a key, it searches the Main database to retrieve the MAC address of the requested station. If the Main database does not hold the desired station address, the NS exits the self proxy process mode (50) and continues as to function as a bridge with the VLAN option (42). Otherwise the NS knows the requested MAC address, and it proceeds to compare the desired station's port number with the port through which the NS is connected to the source station (52). If the source and the requested destination reside on the same port the NS discards the frame, as the destination already received the request and will respond by itself (54), and moves on to the learning process. If the destination connects to the NS through another port, the NS looks at the Router database using the NDA as a key (56) to determine if the resolution query is of a router. If the request is of a router, the NS reverts to function as a bridge (42) and proceeds to flood the request to all its ports. If the request is not of a router, the NS generates an address resolution response indicating the specific station's MAC address according to the network-layer protocol, and transmits it to the source port (58). The NS now enters the learning mode (60) to update its databases.

When the incoming frame is not an address resolution request type (36) or the NS is not configured to process the request (38), or when the NS is in the "self process" mode and does not know the requested destination (50), or when the request is for a router (56), in all of these cases the NS continues to forward the request to all ports (except the source port), thereby functioning as a bridge would according to 802.1D. This process is called "Flooding." However, before flooding the network, the NS must first determine which stations may receive the request based on whether or not the VLAN option is enabled. Therefore, the NS now looks at the VLAN option (42) to determine whether it is enabled. If the VLAN option is disabled, the NS forwards the frame to all its ports, except the port on which it received the frame (the source port). As mentioned above, this mode is called "flooding." Following flooding the NS enters the learning mode (60). If the VLAN option is enabled, the NS processes the broadcast/multicast frame according to the VLAN definition (48). In VLAN mode the NS forwards broadcast or multicast frames only to those ports that belong to the same VLAN number as the source station. The PA database indicates to the NS which ports belong to a particular VLAN number (Table 2b), and it uses this database to determine where to transmit the incoming frame.

The NS may operate in two VLAN modes—subnet or VLAN. When in subnet mode, the NS uses the PA database with the network/subnet entry and the port number. It looks at the incoming frame's network and subnet numbers, searches the PA database (Table 2c) to extract all ports where similar networks or subnets connect, and forwards the incoming frame only to those ports. When in VLAN number mode, the NS uses the PA database with the incoming VLAN number (Table 2b), and extracts all ports where stations with a similar VLAN number connect. The NS forwards the incoming frame only to those ports.

In order to determine the VLAN number of an incoming frame, the NS operates in three modes: Port mode, Address mode, and Tag mode. In Port mode the NS looks at the incoming port, searches the PA database to find this port's VLAN number (Table 2a), and searches the PA database again to extract all the other ports having the same VLAN number (Table 2b). In Address mode the NS searches the Main database using the incoming MAC address (MSA) and extracts that station's VLAN number. Now the NS queries the PA database (Table 2b) with the VLAN number to extract all ports having the same VLAN number. In Tag mode the NS extracts the VLAN number from the incoming frame VLAN tag field, and searches the PA database (Table 2b) for all ports with that VLAN number.

The following paragraphs analyze several examples of network operation with the new NS devices. The examples refer to the network shown in FIG. 3 and the Network Switch flow-charts of FIGS. 4 through 6.

1. The first example assumes two stations A and B connected to segment 1b. Station A needs to communicate with station B. Stations A and B belong to the same network and subnet, and use the same protocol. Station A (source) first checks station B's network address and finds that both belong to the same network number. So station A broadcasts an address resolution request to segment 1b. Station B receives this broadcast and answers with its MAC address. Bridge 1 also receives the broadcast, and forwards it to all its ports (1a, c and d). Router 2 receives the broadcast, but discards it. NS 3 receives the broadcast and processes it (38): if on NS 3, port 3a is configured to operate as "self proxy process" it will detect that the requested port and the source port are the same (52) and discard the frame. If it is configured to operate as a remote proxy, the NS will forward the broadcast request to the designated proxy port only. If the NS is configured not to process such requests it will forward the broadcast according to its VLAN option (42).

Station A now knows B's MAC address, and sends frames to B. Bridge 1 will discard such unicast frames as it knows that the source and destination connect to the same segment 1b.

2. The second example uses stations A and B as above, but now station A has a different network number than station B. Station A recognizes that it connects to a different network than B, and sends the frame to the nearest router according to its routing table. Assuming that router 2 is the designated router, station A sends the frame to Router 2, and Router 2 modifies the frame and sends it to B. NS 3 also receives A's frame to Router 2, but recognizes that the frame destination is Router 2 (14). NS 3 thus recognizes that Router 2 is local to A (18), and discards the frame. Next, NS 3 receives the response from Router 2 to B, recognizes that both are local since they both connect through port 3a (16), and filters the frame. NS 3 moves to the learning process (60). If B's location were unknown, NS 3 would now learn it through Router 2's response.

3. In the third example, station A connects to segment 1a and station B connects to segment 3c. Both stations belong to the same network. Station A starts by broadcasting an address resolution request for station B. Bridge 1 forwards the broadcast to all its ports. Router 2 disregards the broadcast. NS 3 receives the broadcast from segment 3a and processes (38) in the following manner: if NS 3 is configured for "remote proxy process," it forwards the frame to the proxy server port. If NS 3 is configured to "self process," it consults its Main database (44). Then, if it knows where B is located, it generates a response (58). If NS 3 does not know where B is located, it broadcasts, or forwards, the frame according to the VLAN setup (42), and will use B's response to learn B's location.

Both ways A receives B's MAC address, and A now generates unicast frames to B. Bridge 1 will forward A's frame to segment 1d, and NS 3 will forward them to segment 3c.

4. The fourth example uses the configuration of the previous example, except that A has a different network number than B. A sends its frames to Router 2, which modifies the frame to use B's address and transmits it back to segment 2b. NS 3 receives A's frame to Router 2, analyzes that Router 2 is in its Router database (14), but finds that A and Router 2 are local (18) so it discards the frame. Then NS 3 receives Router 2's frame to B, and since it is a unicast frame it forwards it to segment 3c. When B replies, it sends the frame to Router 2. NS 3 intercepts the frame, and since it knows where A is located (28), it modifies the frame and transmits it to A's segment 3a with A's MDA. The response frame does not traverse through Router 2.

5. The fifth example connects station A to segment 3e and B to segment 3b. A and B are configured to use same network numbers. Station A starts by broadcasting B's address resolution request. NS 3 receives this request and either answers it itself (44), forwards it to a proxy server (40), or forwards the broadcast frame to the network (42), and B responds. When station A receive B's response, it continues transmitting using unicast frames, and NS 3 forwards them to segment 3b.

6. The sixth example uses the configuration of the previous example, except that A has a different network number than B. A sends its frames to either Router 2 or Router 6 depending on its routing table. Assuming that A sends the frame to Router 2, NS 3 intercepts the frame and analyzes that the destination is in the Router database (14). It now analyzes that A and Router 2 are not local (18), and extract B's data. If NS 3 knows B's location (22) it further replaces MDA and MSA (28), and transmits the frame directly to segment 3b.

If NS 3 does not know where B is located, it forwards the frame to Router 2 (24) (A and Router 2 are not local). Router 2 responds with unicast frames to B through segment 3a, and NS 3 forwards them to B's location on segment 3b. While doing so, NS 3 learns B's location (60) and updates its Main database. The next time A sends a frame to B it will pass through the Fast Route path and will not traverse through Router 2.

Assuming that A sends the frame to Router 6, and NS 3 does not know B's location, NS 3 forwards the frame to Router 6 through segment 3d. NS 4 receives the frame. If NS 4 knows B's location, it replaces the MDA to Router 6 with B's MAC address (28). It also replaces A's MSA with the MAC address of Router 6, and transmits it to B's location through segment 4a. NS 3 receives the frame (sent to B), transmits it to segment 3b, and learns B's location. The next time A sends a frame to B it will pass through the Fast Route path. If NS 4 also does not know B's location, it forwards the frame to segment 4d for Router 6. NS 5 acts in the same manner (if it knows B's location it acts as above when NS 4 knew B's location, modifies the frame and transmits it to its destination; if not, it forwards the frame to port 5c for Router 6). Router 6 now receives the frame that A sent to B, makes the necessary route calculation including generating an address resolution request, and transmits the frame to B. All NSs in the path now forward the frame from Router 6 to B as a unicast frame while learning B's MAC address and updating their Main database.

7. In the seventh example, A connects to segment 3e, and B connects to segment 2a. A and B use different network numbers. When A needs to send a frame to B, it sends it to Router 2. Since B is located beyond the reach of NS 3 (it connects after Router 2), NS 3 does not know B's MAC address (22), and therefore forwards the frame to Router 2 (24). If somehow NS 3 once learnt B's MAC address it will swap the MDA which contains the address of Router 2, replace it with the address of B, and transmit it through port 3a. If Router 2 operates as a Bridge-router (BRouter) it will forward the frame to B. Otherwise the frame will not reach segment 2a and there will be no communication. However, since B does not connect to the NSs sub-system, in a short period of time NS 3 will forget B's address through the aging process, and then A will be able to communicate with B. In order to avoid this objectionable scenario, one possible modification to the NS operation will be to add the following condition (26): swap the addresses (28) only if the network number exists in the Network database.

While the invention has been described with regard to particular it can be appreciated that many variations modifications and other embodiments of the invention may be made.

What is claimed is:

1. For use in a configuration of interconnected computer networks, each network being made up of at least one station, each station having a MAC address and a network address, the interconnected computer networks handling message traffic in the form of packets of data in accordance with a set of inter-network protocols that use a network addressing scheme, a network switch having the network presence of a bridge, comprising:

(a) a network topology learner for gathering network topology information contained in the message traffic, correlating station MAC addresses with station network addresses;

(b) a database for storing said topology information;

(c) a data packet modifier for modifying address information contained in the data packets; and (d) a packet transmitter for selectively transmitting data packets having a destination address registered in said database to said destination address, and forwarding data packets having a destination address not registered in said database to a router, such that said packet transmitter receives a response from said router and said packet transmitter learns said destination address from said response.

2. The network switch of claim 1, wherein said device includes a plurality of ports.

3. The network switch of claim 2, wherein said network topology learner further correlates the port through which a station connects to the network switch with said network topology information.

4. The network switch of claim 1, wherein said data packet modifier includes means for marking a hop counter included in the data packet.

5. The network switch of claim 1, wherein the device features a silicon based design.

6. A method of operation of a configuration of interconnected networks handling message traffic in accordance with a set of network protocols, the method comprising the steps of:

(a) configuring a plurality of networks to be connected by at least one network switch, said network switch having a network topology learner, a database for correlating MAC addresses, network addresses and network switch port numbers, a data packet modifier and a data packet transmitter, said network also featuring at least one router;

(b) receiving a packet of data at one of said at least one network switch;

(c) wherein said packet includes a network destination address, a destination router MAC address, and a MAC source address and network source address, determining whether said network destination address (NDA) is contained in said network switch database; and (d) if said NDA is contained in said database, correlating said NDA with a destination MAC address, replacing said destination router MAC address with said destination MAC address, replacing said MAC source address (MSA) with said router MAC address and transmitting said modified packet to its destination;

(e) if said NDA is not contained in said database, forwarding said packet to its original router destination;

(f) receiving a response from said original router destination; and (g) learning said NDA from said response.

7. The method of claim 6, further comprising after receiving said packet of data (b), verifying whether said packet is broadcast or unicast; if said packet is unicast, proceeding with the steps (c)–(e) of determining whether said network address is contained in said database, and readdressing said packet and transmitting it to its destination or forwarding said packet to a router; if said packet is broadcast, the method further comprising the step of:

(h) forwarding said packet to all ports, except for the port through which said packet was received.

8. The method of claim 7, further comprising if said packet is broadcast and includes information relating to a broadcast frame rate, the steps of:

(i) measuring said broadcast frame rate;

(j) if said rate exceeds a pre-defined threshold, discard said packet;

(k) if said rate does not exceed said pre-defined threshold, processing said packet as in steps (a)–(h).

9. The method of claim 7, wherein said network configuration features a server functioning as a proxy, if said packet is broadcast the method further comprising the steps of:

(i) determining if said packet is an Address Resolution request;

(j) if said packet is not an Address Resolution request, forwarding said packet to all ports, except the port through which said packet was received;

(k) if said packet is an Address Resolution request, forwarding said packet to said proxy server.

10. The method of claim 7, further comprising:

(i) determining whether said packet is an Address Resolution request;

(j) if said packet is not an Address Resolution request, forwarding said packet to all ports except the port through which said packet was received;

(k) if said packet is an Address Resolution request, extracting said network destination address (NDA) and searching said database for corresponding MAC destination address (MDA);

(l) if said MAC destination address is included in said database, generating a response with said MAC address;

(m) if said MAC destination address is not included in said database, forwarding said Address Resolution request to all ports, except for the port through which said Address Resolution request was received.

11. The method of claim 10, further comprising the steps of:

(n) if said packet is an Address Resolution request, determining whether the network switch is configured for Proxy Processing, Self Processing or No Processing;

(o) if said network switch is configured for Proxy Processing, proceeding as in steps i–k of claim 9 to forward said packet to said proxy server;

(p) if said Network Switch is configured for Self Processing, proceeding as in steps j–l of claim 10 to extract said NDA, search for said corresponding MDA, and generate a response if said MDA is found, or, if said MDA is not found, forwarding said Address Resolution request to all ports except for the port through which said Address Resolution request was received;

(q) if said network switch is configured for No Processing, forwarding said packet to all ports, except for the port through which said packet was received.

12. The method of claim 6 for a network featuring a VLAN configuration, further comprising after the step of locating said network destination address in said database (in step d), the steps of:

(v) analyzing the VLAN configuration of said source address;

(w) if said MAC destination address belongs to the same VLAN as said source address, forwarding said packet to said MAC destination address;

(x) if said MAC destination address does not belong to the same VLAN as said source address, discard said packet.

13. The method of claim 12 for interconnected networks featuring a VLAN configuration, further comprising the steps of determining whether said packet is unicast or broadcast, if said packet is unicast processing said packet as in steps v–x of claim 12, if said packet is broadcast, the method further comprising the steps of:

(y) analyzing the VLAN configuration of said source address;

(z) forwarding said packet to all ports sharing the same VLAN, except for the port through which said packet was received.

14. The method of claim 6, further comprising, if said network destination address (NDA) is not contained in said network switch database, the step of forwarding said packet of data to a router.

15. The method of claim 14, further comprising the steps of:

(aa) analyzing said source address information;

(bb) if said source is listed as a router in said network switch database, if said address information is not accurately contained in said database, updating said database to include said router address information;

(cc) if said source is not a router, if said source address information is not accurately contained in said network switch database, updating said database to include said source address information.

16. The method of claim 15 for interconnected networks featuring a VLAN configuration, further comprising, in addition to the step of analyzing said source address information, analyzing the VLAN configuration of said source, and updating said database to include said VLAN information.

17. The method of claim 15 for a plurality of networks connected by at least one network switch, said network switch having a plurality of ports, each port having a unique port number, the method further comprising:

(dd) analyzing through which port said source connects to said network switch;

(ee) updating said database to correlate said address information with said port number of said port through which said source connects to said network switch.

18. The method of claim 16 for a plurality of networks connected by at least one network switch, said network switch having a plurality of ports, the method further comprising:

(ff) updating said database to correlate said address information and said VLAN information with the port number through which said source connects to said network switch.

19. The method of claim 6, further comprising, after the step of receiving a packet of data at a network switch (b), resetting an aging counter included in said database.

20. The method of claim 6, further comprising the step of:

(h) adding said NDA to said network switch database.

21. The method of claim 20, wherein said NDA is determined from said response substantially without performing ARP (address resolution protocol).

22. A method for operating a plurality of interconnected networks handling message traffic in accordance with a set of network protocols, the method comprising the steps of:

(a) configuring a plurality of networks to be connected by at least one network switch, said network switch having a network topology learner, a database for correlating MAC addresses, network addresses and network switch port numbers, a data packet modifier and a data packet transmitter, said network also featuring at least one router;

(b) receiving a packet of data at one of said at least one network switch;

(c) wherein said packet includes a network destination address, a destination router MAC address, and a MAC source address and network source address, determining whether said network destination address (NDA) is contained in said network switch database; and (d) if said NDA is contained in said database, correlating said NDA with a destination MAC address, replacing said destination router MAC address with said destination MAC address, replacing said MAC source address (MSA) with said router MAC address and transmitting said modified packet to its destination;

(e) if said NDA is not contained in said database, forwarding said packet to its original router destination;

(f) receiving a response from said original router destination, said response including said NDA of said packet, such that said NDA is determined according to said response; and (g) adding said NDA to said database.

23. The method of claim 22, wherein said NDA is determined from said response substantially without performing ARP (address resolution protocol).

24. A method for operating a plurality of interconnected networks handling message traffic in accordance with a set of network protocols, the method comprising the steps of:

(a) configuring a plurality of networks to be connected by at least one network switch, said network switch having a network topology learner, a database for correlating MAC addresses, network addresses and network switch port numbers, a data packet modifier and a data packet transmitter, said network also featuring at least one router;

(b) receiving a packet of data at one of said at least one network switch;

(c) wherein said packet includes a network destination address, a destination router MAC address, and a MAC source address and network source address, determining whether said network destination address (NDA) is contained in said network switch database; and (d) if said NDA is contained in said database, correlating said NDA with a destination MAC address, replacing said destination router MAC address with said destination MAC address, replacing said MAC source address (MSA) with said router MAC address and transmitting said modified packet to its destination;

(e) if said NDA is not contained in said database, forwarding said packet to its original router destination; and (f) determining said NDA substantially without performing ARP (address resolution protocol).

25. The method of claim 24, wherein said NDA is determined according to a response received from said original router destination.

26. A method for operating a plurality of interconnected networks handling message traffic in accordance with a set of network protocols, the method comprising the steps of:

(a) configuring a plurality of networks to be connected by at least one network switch, said network switch having a network topology learner, a database for correlating MAC addresses, network addresses and network switch port numbers, a data packet modifier and a data packet transmitter, said network also featuring at least one router;

(b) receiving a packet of data at one of said at least one network switch;

(c) wherein said packet includes a network destination address, a destination router MAC address, and a MAC source address and network source address, determining whether said network destination address (NDA) is contained in said network switch database; and (d) if said NDA is contained in said database, correlating said NDA with a destination MAC address, replacing said destination router MAC address with said destination MAC address, replacing said MAC source address (MSA) with said router MAC address and transmitting said modified packet to its destination;

(e) if said NDA is not contained in said database, forwarding said packet to its original router destination; and (f) determining said NDA according to a learning procedure, said learning procedure consisting essentially of the steps of:

(i) receiving a response from said original router destination; and (ii) determining said NDA from said response.

* * * * *